US010481708B2

(12) United States Patent
Huang et al.

(10) Patent No.: US 10,481,708 B2
(45) Date of Patent: Nov. 19, 2019

(54) METHOD FOR ELIMINATING/REDUCING IMAGE STICKING OF IN-CELL TOUCH DISPLAY AND MOBILE DEVICE USING THE SAME

(71) Applicant: FocalTech Electronics, Ltd., Grand Cayman (KY)

(72) Inventors: Shen-Chia Huang, Grand Cayman (KY); Ho-Nien Yang, Grand Cayman (KY)

(73) Assignee: FOCALTECH ELECTRONICS, LTD., Grand Cayman (KY)

( * ) Notice: Subject to any disclaimer, the term of this patent is extended or adjusted under 35 U.S.C. 154(b) by 11 days.

(21) Appl. No.: 15/350,542

(22) Filed: Nov. 14, 2016

(65) Prior Publication Data

US 2017/0364169 A1    Dec. 21, 2017

(30) Foreign Application Priority Data

Jun. 15, 2016  (TW) .............................. 105118688 A

(51) Int. Cl.
*G06F 3/041* (2006.01)
*G06F 3/044* (2006.01)
*G09G 3/20* (2006.01)
*G09G 3/36* (2006.01)

(52) U.S. Cl.
CPC ............ *G06F 3/041* (2013.01); *G06F 3/0412* (2013.01); *G06F 3/0416* (2013.01); *G09G 3/20* (2013.01); *G09G 3/3655* (2013.01); *G06F 3/044* (2013.01); *G09G 2310/0232* (2013.01); *G09G 2320/0257* (2013.01)

(58) Field of Classification Search
CPC ...... G06F 3/041; G06F 3/0416; G06F 3/0412; G06F 3/044; G09G 3/3655; G09G 3/20; G09G 2310/0232; G09G 2320/0257
See application file for complete search history.

(56) References Cited

U.S. PATENT DOCUMENTS

| 2012/0050217 A1* | 3/2012 | Noguchi ............... G06F 3/0412 345/174 |
| 2012/0206436 A1* | 8/2012 | Nakata ............... G02F 1/134309 345/212 |
| 2012/0206500 A1* | 8/2012 | Koprowski .......... G09G 3/3651 345/690 |

(Continued)

*Primary Examiner* — Brent D Castiaux
(74) *Attorney, Agent, or Firm* — Muncy, Geissler, Olds & Lowe, P.C.

(57) ABSTRACT

A method for eliminating image sticking of an in-cell touch display and a mobile device using the same are provided. The method comprises the steps of: providing at least a first common electrode and a second common electrode in the in-cell touch display to perform touch sensing, wherein the first common electrode is electrically connected to a first pin of a touch control circuit through a first charge/discharge route, the second common electrode is electrically connected to a second pin of the touch control circuit through a second charge/discharge route; and in a time except for display time, controlling the first pin and the second pin so that a voltage of the first pin is higher than a voltage of the second pin for at least a first preset period, and then controlling the first pin and the second pin so that a voltage of the second pin is higher than the voltage of the first pin for at least the first preset period.

20 Claims, 15 Drawing Sheets

(56) References Cited

U.S. PATENT DOCUMENTS

| | | | |
|---|---|---|---|
| 2012/0218482 A1* | 8/2012 | Hwang | G06F 3/044 349/12 |
| 2014/0111473 A1* | 4/2014 | Yang | G06F 3/044 345/174 |
| 2014/0362034 A1* | 12/2014 | Mo | G06F 3/044 345/174 |
| 2015/0109265 A1* | 4/2015 | Chan | G09G 3/20 345/204 |

* cited by examiner

METHOD FOR ELIMINATING/REDUCING IMAGE STICKING OF IN-CELL TOUCH DISPLAY AND MOBILE DEVICE USING THE SAME

This application claims priority of application No. 105118688 filed in Taiwan R.O.C. on Jun. 15, 2016 under 35 USC 119, the entire content of which is hereby incorporated by reference.

BACKGROUND OF THE INVENTION

Field of the Invention

The invention relates to the technology of an in-cell touch display, and more particularly to a method for eliminating/reducing image sticking of an in-cell touch display and a mobile device using the same.

Description of the Related Art

A conventional liquid crystal display is usually filled with liquid crystal molecules and composed of color or monochrome pixels disposed in front of a light source (e.g., a backlight source) or a light reflector. Each addressable pixel of the display comprises a liquid crystal unit disposed closest to two electrodes. An intensity of an electric field between the electrodes can be changed by configuring a voltage between the two electrodes. The intensity of the electric field makes the molecules in the liquid crystal unit present a specific direction (i.e., parallel to or perpendicular to the electric field, or at a certain angle therebetween) with respect to the intensity of the electric field. When the liquid crystal is combined with a polarizer in a proper direction, the liquid crystal unit actually acts as a light gate to allow a predetermined number of photons at positions corresponding to the pixels to be outputted to the display. Therefore, the display can generate various levels of gray scales (or various levels of red, green or blue in a color condition) by adjusting the voltage between the two electrodes.

If the voltage between the two electrodes is held constant within a prolonged time interval, the so-called "image sticking" phenomenon occurs. This condition tends to occur especially in the in-cell touch display, in which a common voltage electrode is cut. FIG. 1 shows a structure of a conventional in-cell touch display. Referring to FIG. 1, in order to possess the touch sensing and liquid crystal displaying effects in an in-cell touch display 100, a reference voltage electrode of the liquid crystal display, which is originally used, is cut into multiple touch sensing electrodes 101, and one frame period is divided into a display period and a touch sensing period. Each touch sensing electrode 101 is set to a display common voltage (typically a negative voltage) in the display period, and a display driving and touch integrated circuit 102 of the touch sensing electrode 101 transmits a touch signal to the corresponding touch sensing electrode 101 in the touch sensing period to detect whether the touch sensing electrode 101 is touched or not.

However, the touch sensing electrodes 101 are connected to different pins of the display driving and touch integrated circuit 102, and route lengths from the touch sensing electrodes 101 to the display driving and touch integrated circuit 102 are different. FIG. 2 is a schematic view showing how image sticking of the conventional in-cell touch display is caused. In order to describe the causes of image sticking of the in-cell touch display, only a first touch sensing electrode 201 and a second touch sensing electrode 202 are depicted in FIG. 2. The first touch sensing electrode 201 is electrically connected to the display driving and touch integrated circuit 102 through a first charge/discharge route R1, and the second touch sensing electrode 202 is electrically connected to the display driving and touch integrated circuit 102 through a second charge/discharge route R2.

Because the first charge/discharge route R1 and the second charge/discharge route R2 have different lengths, the resistance of the first charge/discharge route R1 is different from the resistance of the second charge/discharge route R2. An equivalent capacitance of the first touch sensing electrode 201 with respect to the ground may be regarded as the same as an equivalent capacitance of the second touch sensing electrode 202 with respect to the ground. Because the length of the first charge/discharge route R1 is longer than the length of the second charge/discharge route R2, the resistance of the first charge/discharge route R1 is greater than the resistance of the second charge/discharge route R2. Thus, the resistor-capacitor (RC) delay composed of the first charge/discharge route R1 and a first common electrode 201 is longer than the RC delay composed of the second charge/discharge route R2 and a second common electrode 202. So, even if P1 and P2 concurrently output a pulse signal SP1 and a pulse signal SP2, a signal SRC2 received by the second common electrode 202 is delayed by the time T2, and a signal SRC1 received by the first common electrode 201 is delayed by the time T1, T1−T2=ΔT. In the ΔT time, the voltage of the second common electrode 202 is lower than the voltage of the first common electrode 201.

Parasitic charges are accumulated between the neighboring first touch sensing electrode 201 and second touch sensing electrode 202 for a long time, so that the accumulated charges would cause the image sticking. FIG. 3 is a schematic view showing image sticking caused by the cutting of the reference voltage electrode in the conventional in-cell touch display. As shown in FIG. 3, a dashed-line portion 301 represents the grid-like image sticking caused by the above-mentioned reasons.

SUMMARY OF THE INVENTION

An aspect of the present invention is to provide a method for eliminating/reducing image sticking of an in-cell touch display, and a mobile device using the same to eliminate/reduce image sticking caused by accumulated charges caused by cutting of a common voltage electrode.

Accordingly, the present invention provides a method for eliminating/reducing panel image sticking of an in-cell touch display. The method for eliminating/reducing image sticking of the in-cell touch display comprises the following steps. At least a first common electrode and a second common electrode are provided in the in-cell touch display to perform touch sensing, wherein the first common electrode and the second common electrode are used to perform touch sensing, wherein the first common electrode is electrically connected to a first pin of a touch control circuit through a first charge/discharge route, the second common electrode is electrically connected to a second pin of the touch control circuit through a second charge/discharge route; and in a time except the time for performing displaying, the first pin and the second pin are controlled to make a voltage of the first pin be higher than a voltage of the second pin for at least a first preset period. Thereafter, the first pin and the second pin are controlled to make the voltage of the second pin be higher than the voltage of the first pin for at least the first preset period.

The present invention further provides a mobile device. The mobile device comprises an in-cell touch display and a touch control circuit. The in-cell touch display comprises at least a first common electrode and a second common electrode to perform touch sensing. The touch control circuit comprises at least a first pin and a second pin, wherein the first common electrode is electrically connected to the first pin of the touch control circuit through a first charge/discharge route, and the second common electrode is electrically connected to the second pin of the touch control circuit through a second charge/discharge route. In a time except the time for performing displaying, the touch control circuit controls the first pin and the second pin to make a voltage of the first pin higher than a voltage of the second pin for at least a first preset period. Thereafter, the touch control circuit controls the first pin and the second pin to make the voltage of the second pin higher than the voltage of the first pin for at least the first preset period.

In the method for eliminating/reducing panel image sticking of an in-cell touch display and the mobile device thereof according to an preferred embodiment of the present invention, the in-cell touch display comprises at least a first common electrode and a second common electrode to perform touch sensing, wherein the in-cell touch display comprises N first common electrodes and N second common electrodes, wherein the $K^{th}$ first common electrode is electrically connected to the $K^{th}$ first pin of the touch control circuit through a $K^{th}$ first charge/discharge route, and the $K^{th}$ second common electrode is electrically connected to a $K^{th}$ second pin of the touch control circuit through a $K^{th}$ second charge/discharge route, where K and N are natural numbers, and N≥K>0.

In the method for eliminating/reducing panel image sticking of an in-cell touch display and the mobile device thereof according to a preferred embodiment of the present invention, the abovementioned steps further includes: dividing a frame period into display sub-periods and touch sub-periods. In addition, in the first preset period before the $I^{th}$ touch sub-period, the second pins are firstly controlled to provide a specific voltage, and the first pins are controlled to provide a display common voltage, and then concurrently the first pins and the second pins are controlled to make the second pins and the first pins perform touch sensing, and in the first preset period before ending of the $I^{th}$ display sub-period, the first pins are firstly controlled to provide the specific voltage, and then the second pins are controlled and the first pins to concurrently output a display common voltage, where I is a natural number.

The essence of the present invention is to divide the touch sensing electrodes into at least two sets in the non-display duration, wherein the two sets of touch sensing electrodes are respectively applied with a first voltage and a second voltage different from the first voltage. Thereafter, one set of the touch sensing electrodes, which are formerly applied with the first voltage, are applied with the second voltage, and the other set of the touch sensing electrodes, which are formerly applied with the second voltage, are applied with the first voltage. The operations are repeated so that the electric-field direction switches between the first set of touch sensing electrodes and the second set of touch sensing electrodes continuously. Thus, the charge accumulation effect caused by the voltage difference between the two sets of touch sensing electrodes can be effectively cancelled out, and the image sticking phenomenon of the display device is further eliminated or reduced.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

Figure 1:
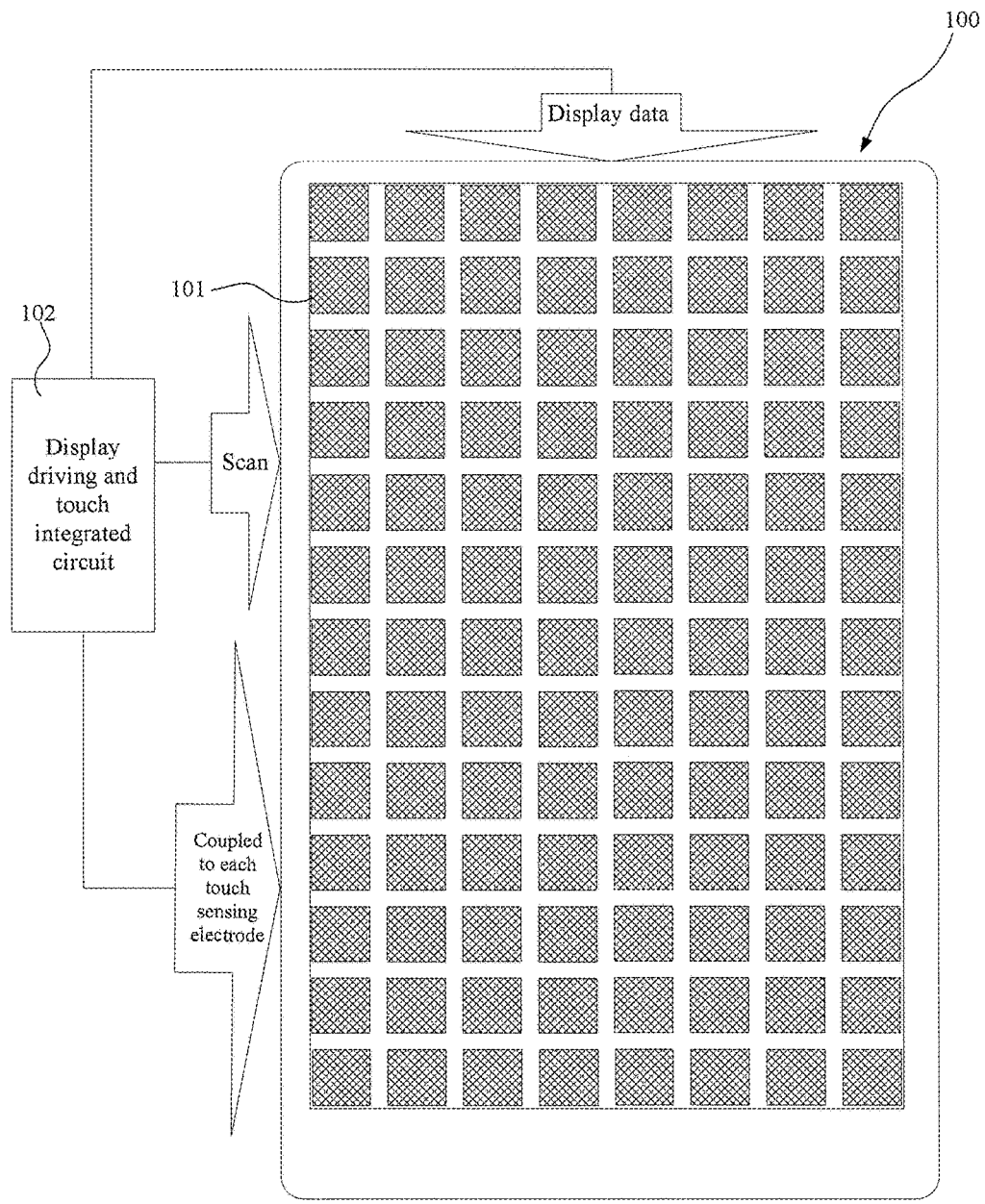
FIG. 1 shows a structure of a conventional in-cell touch display.
Figure 2:
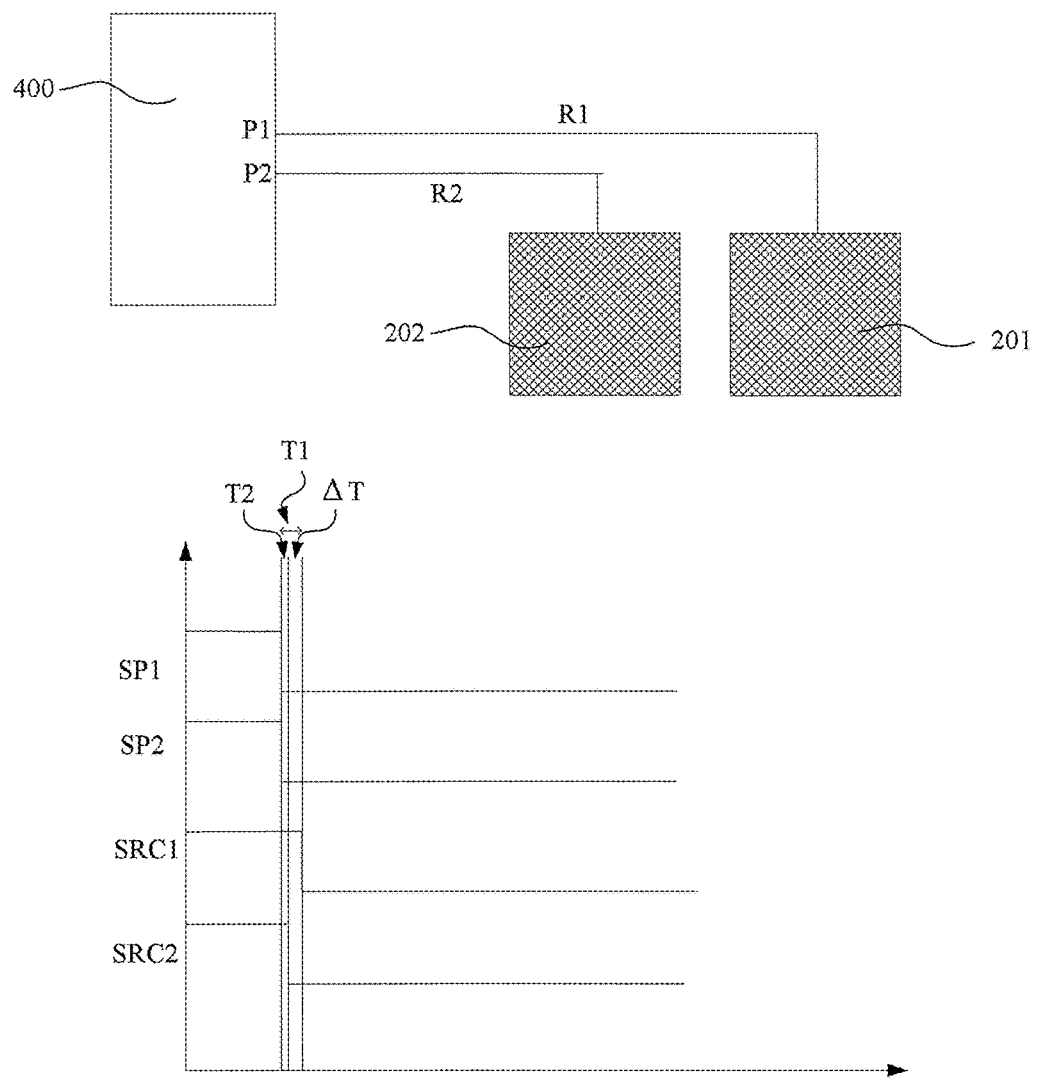
FIG. 2 is a schematic view showing causes of image sticking of the conventional in-cell touch display.
Figure 3:
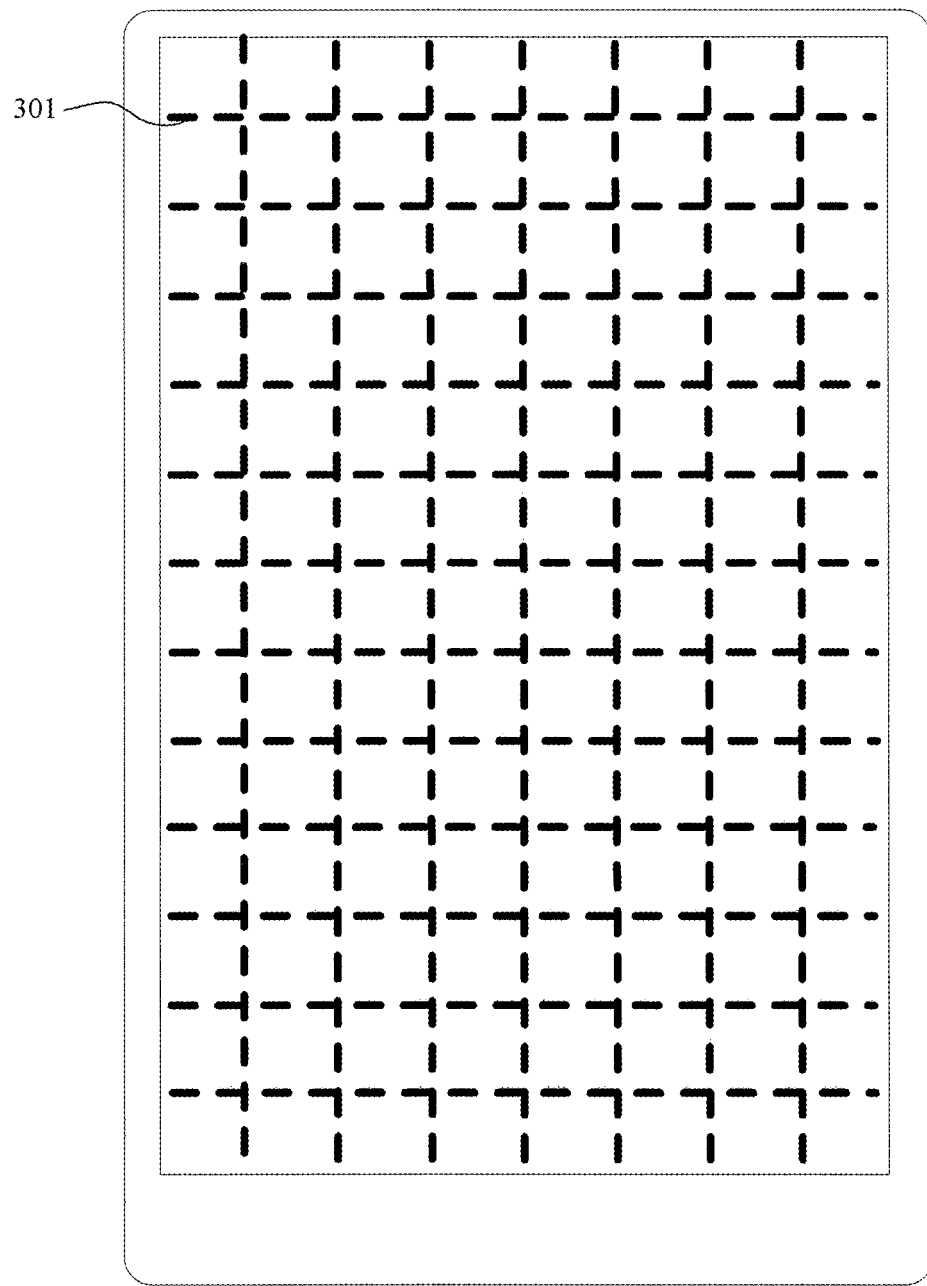
FIG. 3 is a schematic view showing image sticking caused by the cutting of the reference voltage electrode in the conventional in-cell touch display.
Figure 4:
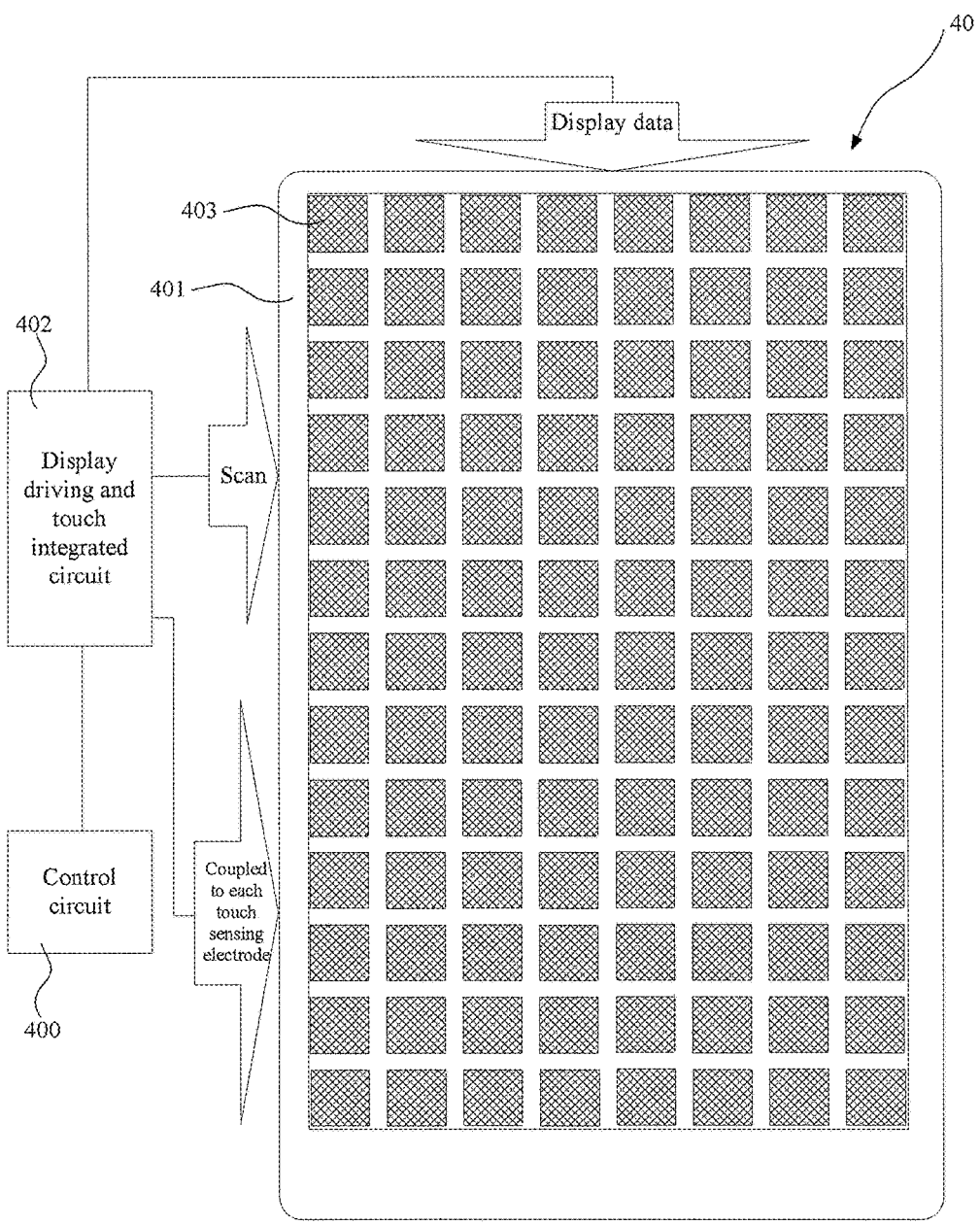
FIG. 4 is a circuit block diagram showing a mobile device according to a preferred embodiment of the present invention.

FIG. 4 is a circuit block diagram of a mobile device 40 according to a preferred embodiment of the present invention. Referring to FIG. 4, the mobile device 40 comprises a control circuit 400, an in-cell touch display 401 and a display driving and touch integrated circuit 402. The control circuit 400 is, for example, a central processing unit of the mobile device, or software/hardware of an operation system working in conjunction with the central processing unit, or the like. The in-cell touch display 401 comprises multiple touch sensing electrodes 403. The touch sensing electrode 403 is used to provide a display common voltage to each pixel to serve as a reference voltage in a display period. Each touch sensing electrode 403 is electrically connected to a corresponding pin of a touch integrated circuit 402 through a corresponding charge/discharge route (not shown and to be described later). In this embodiment, there are 8×13 touch sensing electrodes 403 for example. So, the display driving and touch integrated circuit 402 has 8×13 pins, and is electrically connected to 8×13 touch sensing electrodes 403 through 8×13 charge/discharge routes. It is to be noted that the present invention is not limited thereto.

Figure 5:
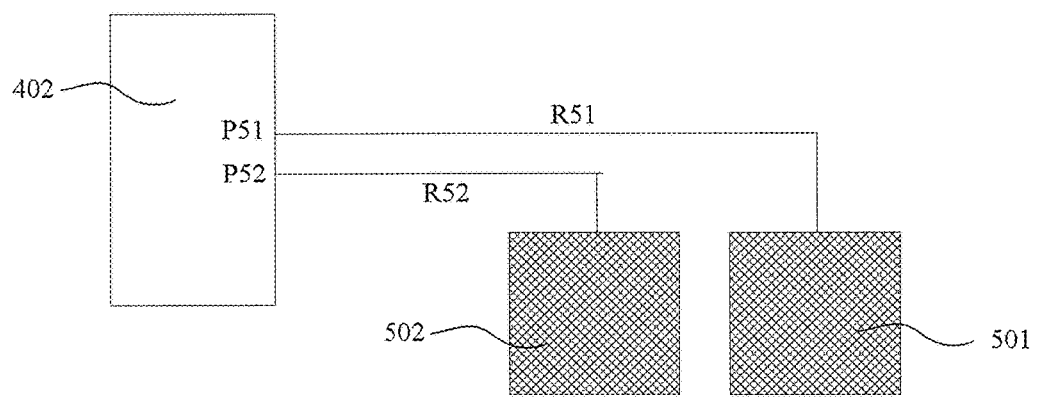
FIG. 5 is a concept chart showing a method for eliminating/reducing image sticking of an in-cell touch display according to a preferred embodiment of the present invention.
Figure 5:
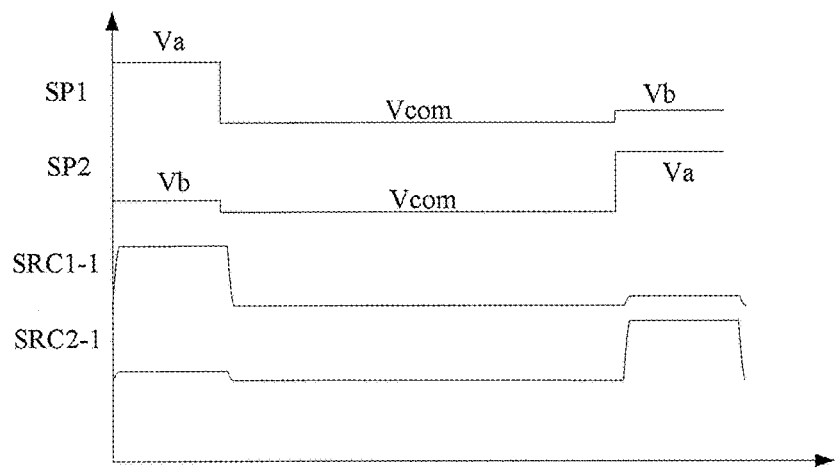

In order to make the essence of the present invention easily understood, two touch sensing electrodes 403 are described as example in this embodiment. FIG. 5 is a concept chart showing a method for eliminating/reducing image sticking of an in-cell touch display according to a preferred embodiment of the invention. Referring to FIG. 5, it illustrates a display driving and touch integrated circuit 402, a first common electrode 501 and a second common electrode 502. The first common electrode 501 and the second common electrode 502 is for performing touch sensing in a non-display period, and thus they correspond to the touch sensing electrode 403 of FIG. 4. The display driving and touch integrated circuit 402 comprises a first pin P51 and a second pin P52. The first pin P51 of the display driving and touch integrated circuit 402 is electrically connected to the first common electrode 501 through a first charge/discharge route R51. The second pin P52 of the display driving and touch integrated circuit 402 is electrically connected to the second common electrode 502 through a second charge/discharge route R52.

In this embodiment, in a non-display and non-touch sensing period T1, the first pin P51 of the display driving and touch integrated circuit 402 firstly outputs a voltage higher than that of the second pin P52 of the display driving and touch integrated circuit 402 for a preset period T2. Then, only in another non-display and non-touch sensing period T3, the second pin P52 of the display driving and touch integrated circuit 402 starts to output a voltage higher than that of the first pin P51 of the display driving and touch integrated circuit 402 for one preset period T2 similarly. The alternating driving continuously switches the electric-field direction between the second common electrode 502 and the first common electrode 501. Thus, the accumulated charges caused by the minor voltage difference between the common electrodes, or charges accumulated across other routes on the panel can be effectively cancelled out each other, so that the image sticking phenomenon can be reduced.

Figure 6:
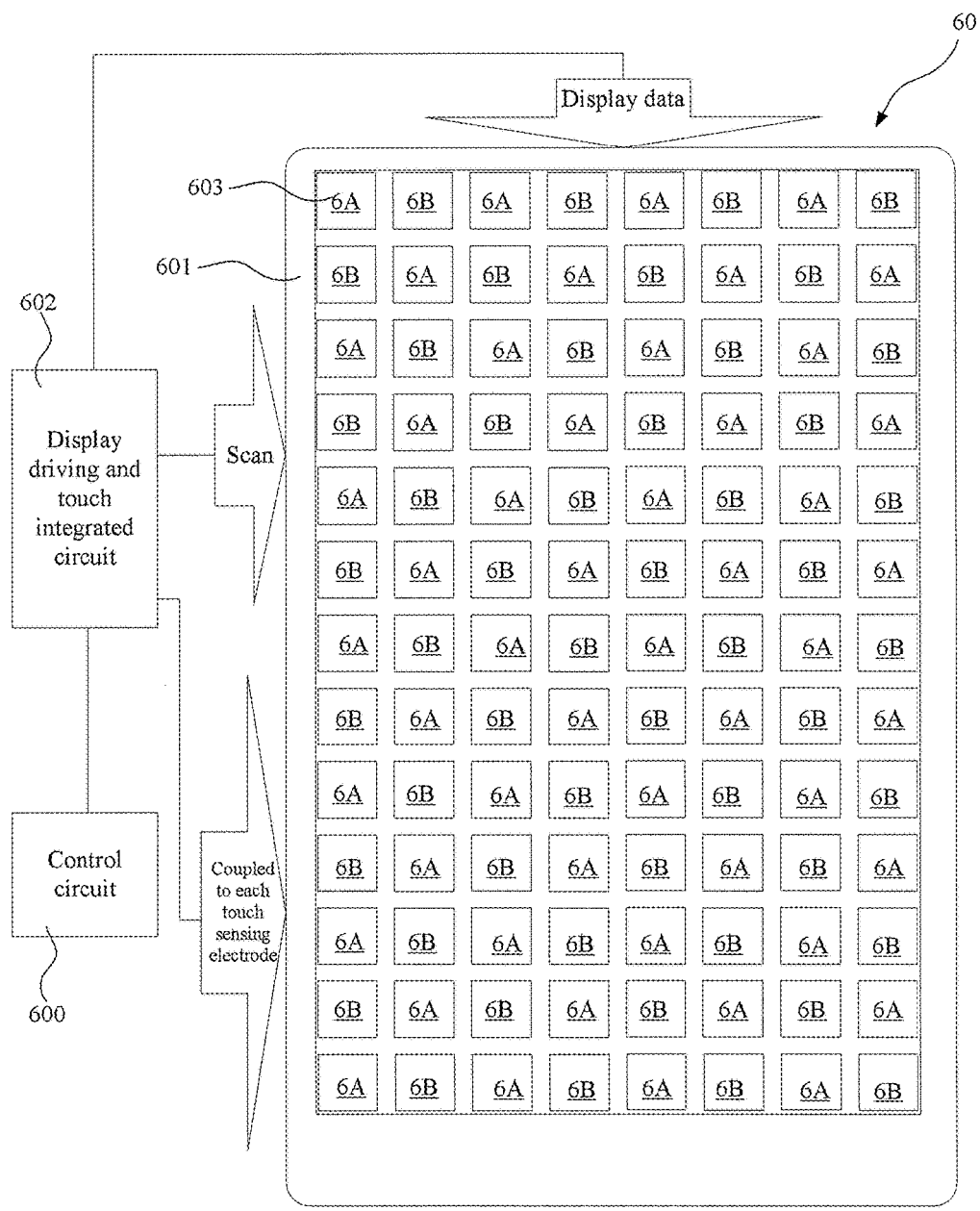
FIG. 6 is a schematic view showing a mobile device 60 adopting a method for eliminating/reducing image sticking of the in-cell touch display according to a preferred embodiment of the present invention.
Figure 7:
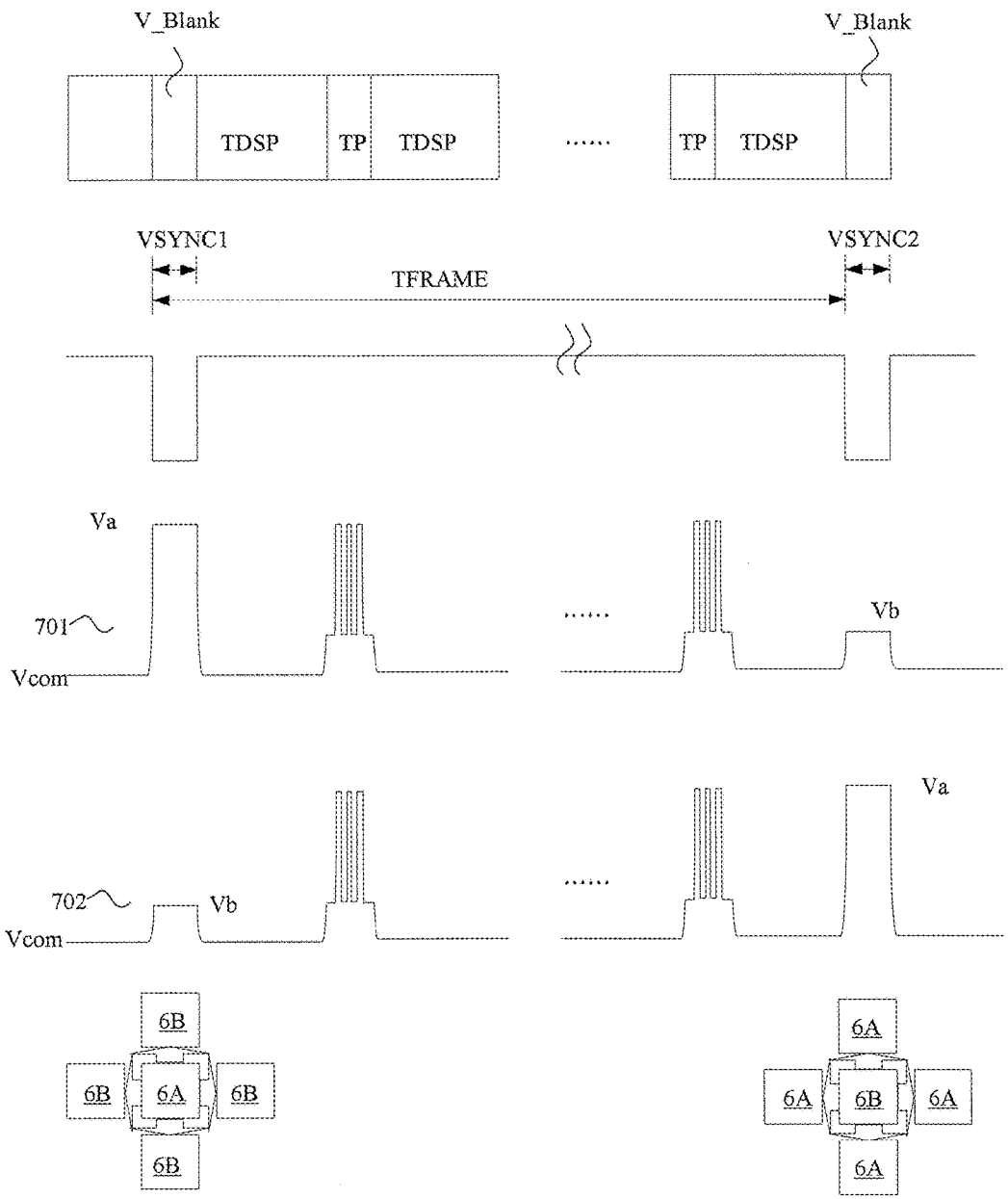
FIG. 7 is an operation waveform chart showing a method for eliminating/reducing panel image sticking of the in-cell touch display according to a preferred embodiment of the present invention.

FIG. 6 is a schematic view showing a mobile device 60 adopting a method for eliminating/reducing image sticking of the in-cell touch display according to a preferred embodiment of the invention. FIG. 7 is an operation waveform chart showing a method for eliminating/reducing panel image sticking of the in-cell touch display according to a preferred embodiment of the invention. Referring to FIGS. 6 and 7, the mobile device 60 in this embodiment includes a control circuit 600, an in-cell touch display 601 and a display driving and touch integrated circuit 602. The multiple touch sensing electrodes in the in-cell touch display 601 are divided into a first set of touch sensing electrodes 6A and a second set of touch sensing electrodes 6B.

A waveform 701 represents a waveform provided to the first set of touch sensing electrodes 6A; and a waveform 702 represents a waveform provided to the second set of touch sensing electrodes 6B. In this embodiment, one frame period TFRAME is divided into multiple display time periods TDSP and multiple touch sensing time periods TP. In this embodiment, vertical synchronization periods VSYNC1 and VSYNC2 are reserved without touch sensing being performed, so a vertical blank gap V_Blank is further reserved in each frame period TFRAME. In the first vertical synchronization period VSYNC1, the display driving and touch integrated circuit 602 provides a first voltage Va to the first set of touch sensing electrodes 6A, and the display driving and touch integrated circuit 602 provides a second voltage Vb to the second set of touch sensing electrodes 6B. In this preferred embodiment, the first voltage Va is higher than the second voltage Vb, the first voltage Va is a positive voltage, the second voltage Vb is 0V, and a display common voltage Vcom is a negative voltage. At this time, the electric-field direction is from the first set of touch sensing electrodes 6A to the second set of touch sensing electrodes 6B. In the second vertical synchronization period VSYNC2, the display driving and touch integrated circuit 602 provides the second voltage Vb to the first set of touch sensing electrodes 6A, and the display driving and touch integrated circuit 602 provides the first voltage Va to the second set of touch sensing electrodes 6B. At this time, the electric-field direction is from the second set of touch sensing electrodes 6B to the first set of touch sensing electrodes 6A.

It is assumed that the frame rate is equal to 60 frames per second, and there are 30 counts of the electric-field direction switching between the first set of touch sensing electrodes 6A and the second set of touch sensing electrodes 6B per second in the above-mentioned embodiment. Because each side of each of the touch sensing electrodes 6A and 6B can encounter the intensity and the direction of each electric field, the accumulated charges caused by the voltage difference between the touch sensing electrodes can be effectively cancelled out, so that the image sticking phenomenon of the panel can be reduced.

Figure 8:
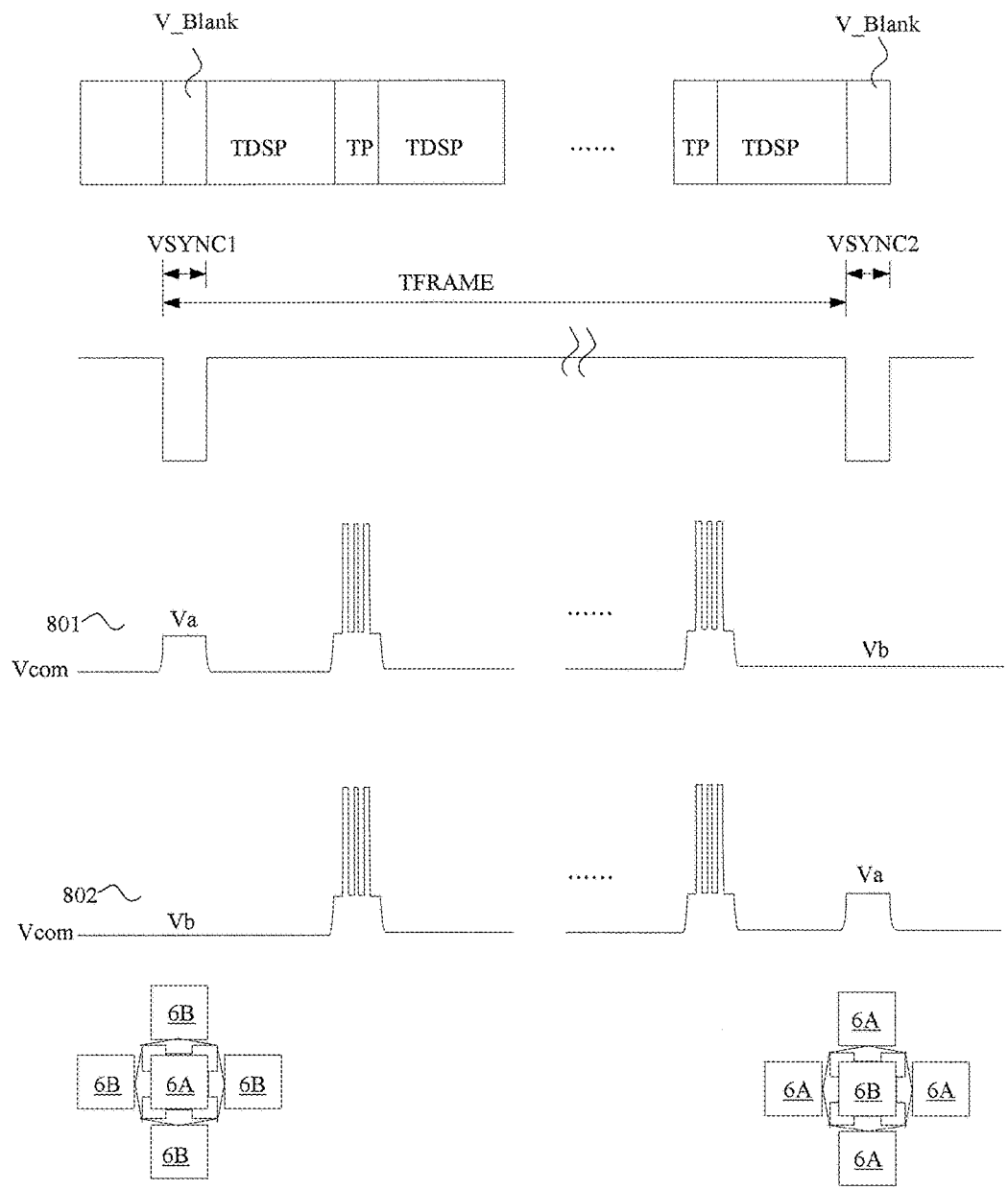
FIG. 8 is an operation waveform chart showing a method for eliminating/reducing image sticking of the in-cell touch display according to a preferred embodiment of the present invention.

FIG. 8 is an operation waveform chart showing a method for eliminating/reducing image sticking of the in-cell touch display according to a preferred embodiment of the present invention. Referring to FIG. 8, in a similar manner, a waveform 801 represents the waveform provided to the first set of touch sensing electrodes 6A; and a waveform 802 represents the waveform provided to the second set of touch sensing electrodes 6B. By comparing FIG. 7 with FIG. 8, it is obtained that the second voltage Vb of FIG. 8 is the display common voltage, and the first voltage Va of FIG. 8 is 0V. Similarly, because each side of each of the touch sensing electrodes 6A and 6B can encounter the intensity and the direction of each electric field, the accumulated charges caused by the voltage difference between the touch sensing electrodes can be effectively cancelled out, so that the image sticking phenomenon of the panel can be reduced.

Figure 9:
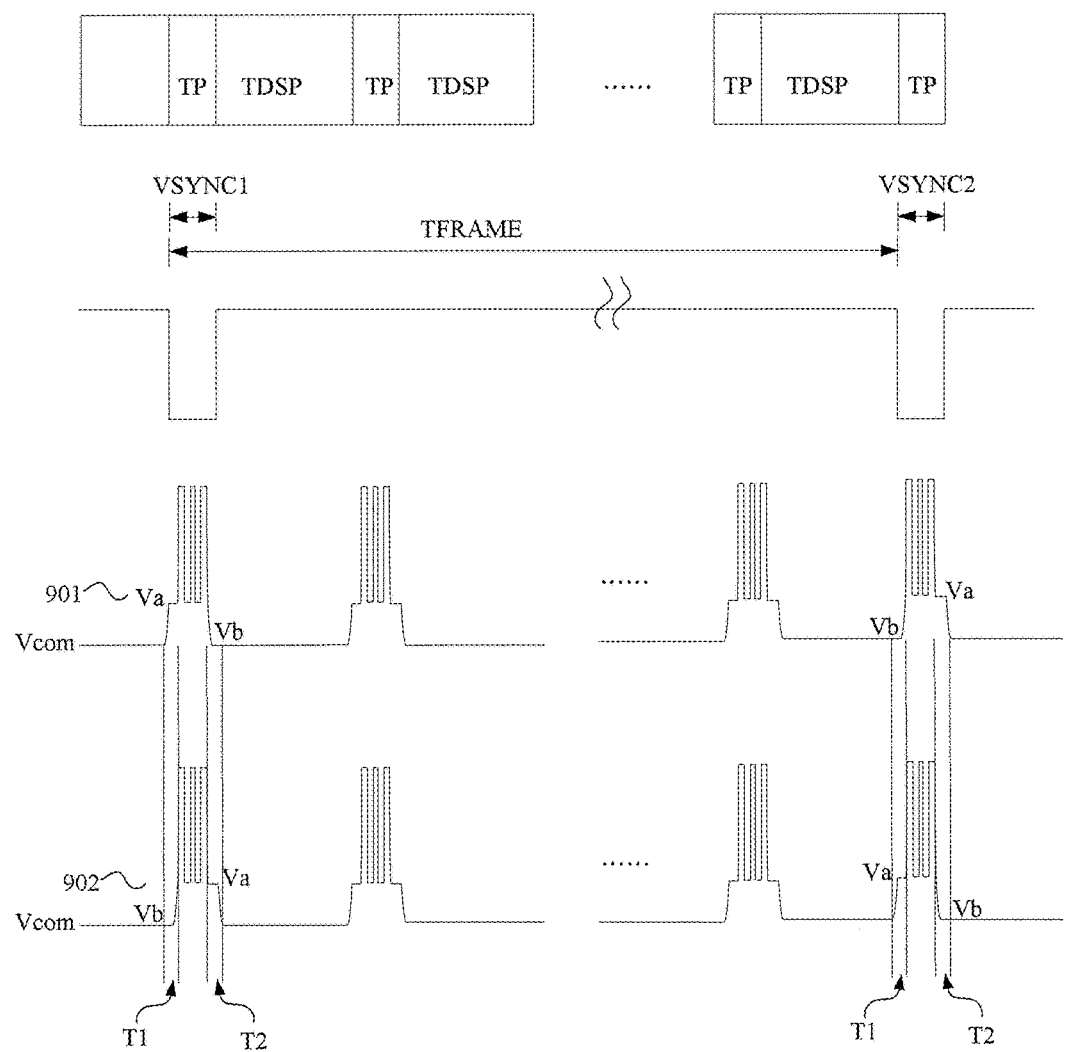
FIG. 9 is an operation waveform chart showing a method for eliminating/reducing image sticking of the in-cell touch display according to a preferred embodiment of the present invention.

FIG. 9 is an operation waveform chart showing a method for eliminating/reducing image sticking of the in-cell touch display according to a preferred embodiment of the present invention. Referring to FIG. 9, in a similar manner, a waveform 901 represents the waveform provided to the first set of touch sensing electrodes 6A; and a waveform 902 represents the waveform provided to the second set of touch sensing electrodes 6B. In a first predetermined duration T1 after the first vertical synchronization period VSYNC1 begins, the display driving and touch integrated circuit 602 provides the first voltage Va to the first set of touch sensing electrodes 6A, and the display driving and touch integrated circuit 602 provides the second voltage Vb to the second set of touch sensing electrodes 6B. Thereafter, the display driving and touch integrated circuit 602 provides the touch sensing signal to the first set of touch sensing electrodes 6A and the second set of touch sensing electrodes 6B to perform touch sensing. After the touch sensing is performed, in a second predetermined duration T2 before the first vertical synchronization period VSYNC1 ends, the display driving and touch integrated circuit 602 provides the second voltage Vb to the first set of touch sensing electrodes 6A, and the display driving and touch integrated circuit 602 provides the first voltage Va to the second set of touch sensing electrodes 6B.

Similarly, in the first predetermined duration T1 after the second vertical synchronization period VSYNC2 begins, the display driving and touch integrated circuit 602 provides the first voltage Va to the first set of touch sensing electrodes 6A, and the display driving and touch integrated circuit 602 provides the second voltage Vb to the second set of touch sensing electrodes 6B. Thereafter, the display driving and touch integrated circuit 602 provides the touch sensing signal to the first set of touch sensing electrodes 6A and the second set of touch sensing electrodes 6B to perform touch sensing. After the touch sensing is performed, in the second predetermined duration T2 before the second vertical synchronization period VSYNC2 ends, the display driving and touch integrated circuit 602 provides the second voltage Vb to the first set of touch sensing electrodes 6A, and the display driving and touch integrated circuit 602 provides the first voltage Va to the second set of touch sensing electrodes 6B.

By comparing the embodiment of FIG. 9 with the embodiment of FIG. 7, the electric field switching time in the embodiment of FIG. 9 is shortened, but there are 60 counts of electric-field direction switching between the first set of touch sensing electrodes 6A and the second set of touch sensing electrodes 6B per second. The electric field switching counts in the embodiment of FIG. 9 is greater than the electric field switching counts in the embodiment of FIG. 7. In addition, the second predetermined duration T2 is equal to the first predetermined duration T1 in the preferred embodiment.

Figure 10:
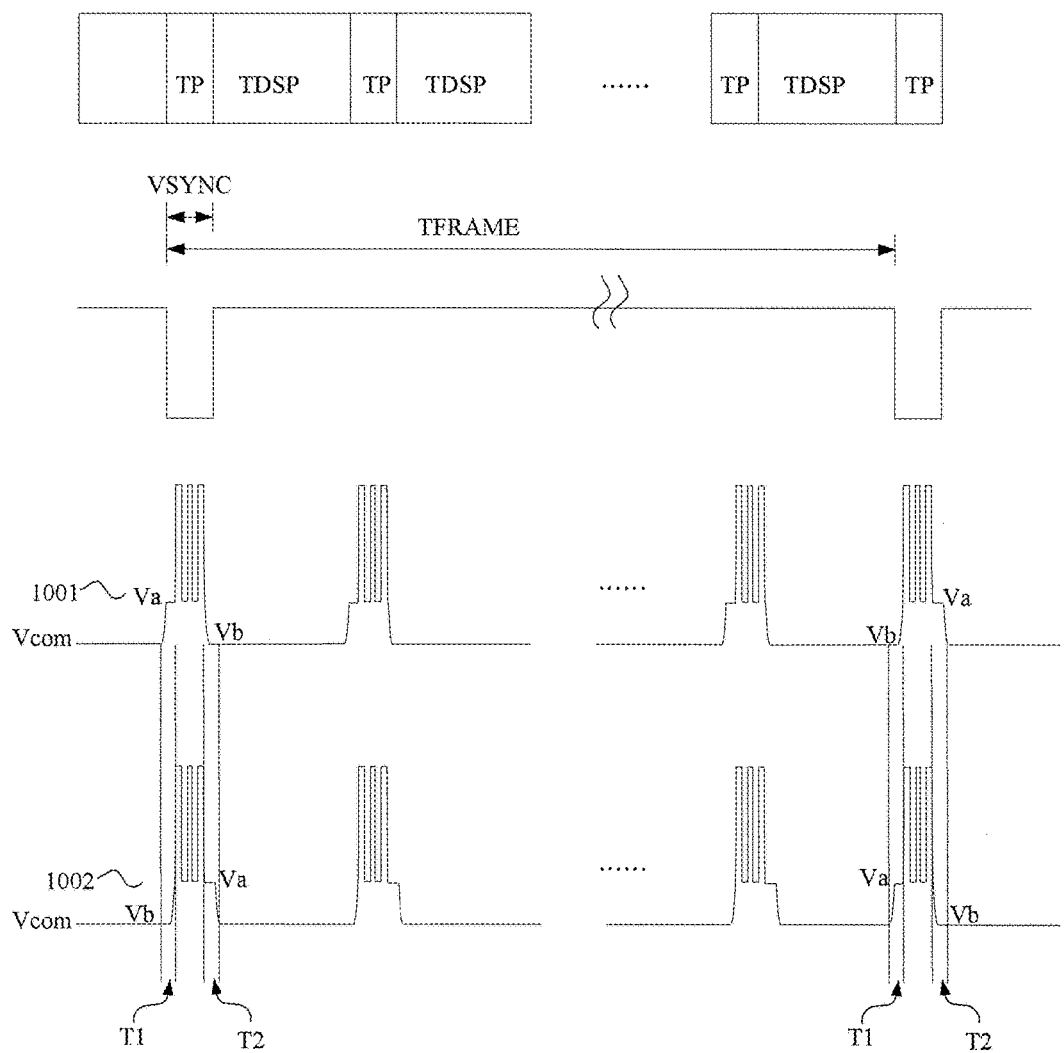
FIG. 10 is an operation waveform chart showing a method for eliminating/reducing image sticking of the in-cell touch display according to a preferred embodiment of the present invention.

FIG. 10 is an operation waveform chart showing a method for eliminating/reducing image sticking of the in-cell touch display according to a preferred embodiment of the present invention. Referring to FIG. 10, in a similar manner, a waveform 1001 represents the waveform provided to the first set of touch sensing electrodes 6A; and a waveform 1002 represents the waveform provided to the second set of touch sensing electrodes 6B. In this embodiment, in the first predetermined duration T1 after each touch sensing time period TP begins, the display driving and touch integrated circuit 602 provides the first voltage Va to the first set of touch sensing electrodes 6A, and the display driving and touch integrated circuit 602 provides the second voltage Vb to the second set of touch sensing electrodes 6B. Thereafter, the display driving and touch integrated circuit 602 provides the touch sensing signal to the first set of touch sensing electrodes 6A and the second set of touch sensing electrodes 6B to perform touch sensing. After the touch sensing is performed, in the second predetermined duration T2 before the touch sensing time period TP ends, the display driving and touch integrated circuit 602 provides the second voltage Vb to the first set of touch sensing electrodes 6A, and the display driving and touch integrated circuit 602 provides the first voltage Va to the second set of touch sensing electrodes 6B.

By comparing the embodiment of FIG. 10 with the embodiment of FIG. 9, the count of the switching of the electric-field direction between the first set of touch sensing electrodes 6A and the second set of touch sensing electrodes 6B is further increased in the embodiment of FIG. 10. However, the electric field switching performed on the touch sensing electrodes 6A and 6B tends to make the user observe the grid-like image in the display period. In addition, the first voltage Va is equal to 0V, and the second voltage Vb is equal to the display common voltage Vcom in the described embodiment. However, those skilled in the art should know that the second voltage Vb may also be equal to 0V, and the first voltage Va only needs to be higher than the second voltage Vb. Thus, the invention is not limited thereto.

Figure 11:
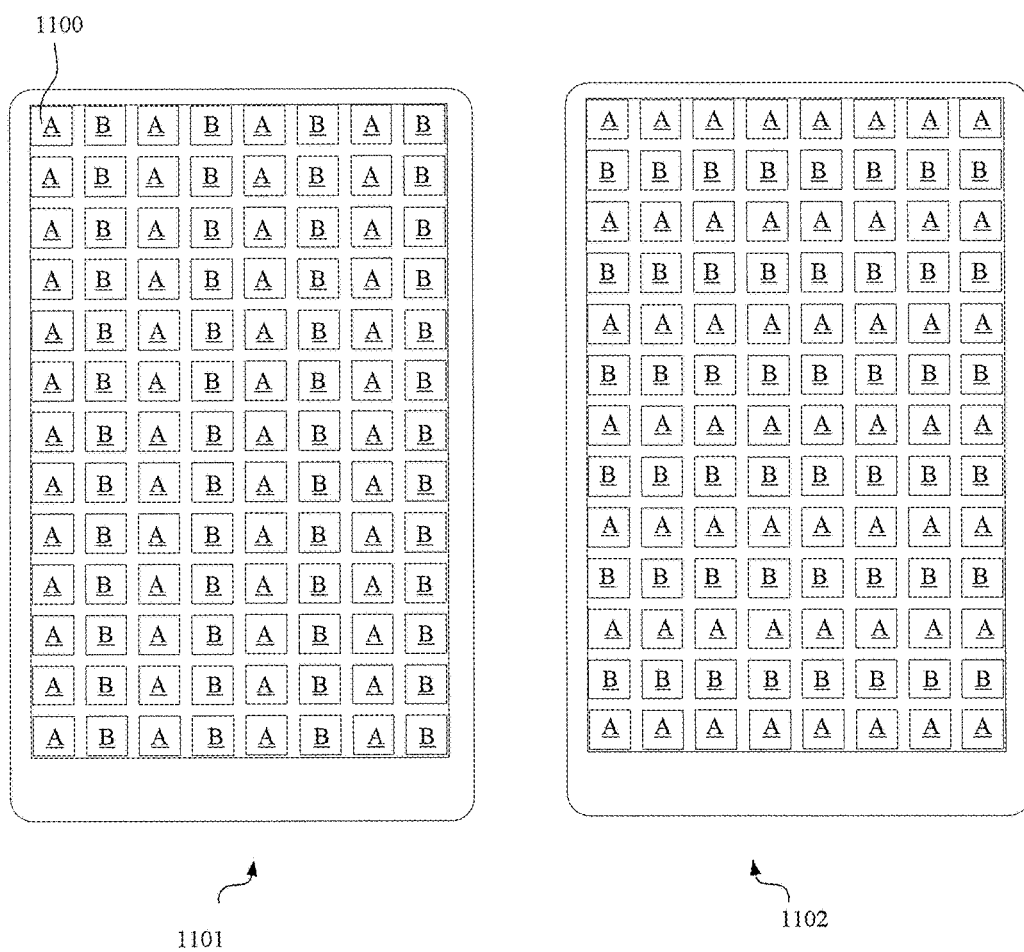
FIG. 11 is a schematic view showing a schematic view showing grouping of a touch sensing electrode 1100 adopting the method for eliminating/reducing image sticking of the in-cell touch display according to a preferred embodiment of the present invention.

FIG. 11 is a schematic view showing a schematic view showing grouping of a touch sensing electrode 1100 adopting the method for eliminating/reducing image sticking of the in-cell touch display according to a preferred embodiment of the present invention. Referring to FIGS. 11 and 6, the touch sensing electrode 1100 in this embodiment is similarly divided into two sets, which are represented by A and B, respectively. However, upon executing of the method for eliminating/reducing image sticking of the in-cell touch display according to the preferred embodiment of the invention, the electric field switching is firstly performed according to the grouping method of the symbol 1101, and then the electric field switching is performed according to the grouping method of the symbol 1102. Likewise, the grouping method of the embodiment is an optional design. The designer performs the grouping of the touch sensing electrode 1100 according to different requirements. In addition, there may be more than two sets, and the invention is not limited thereto.

Figure 12:
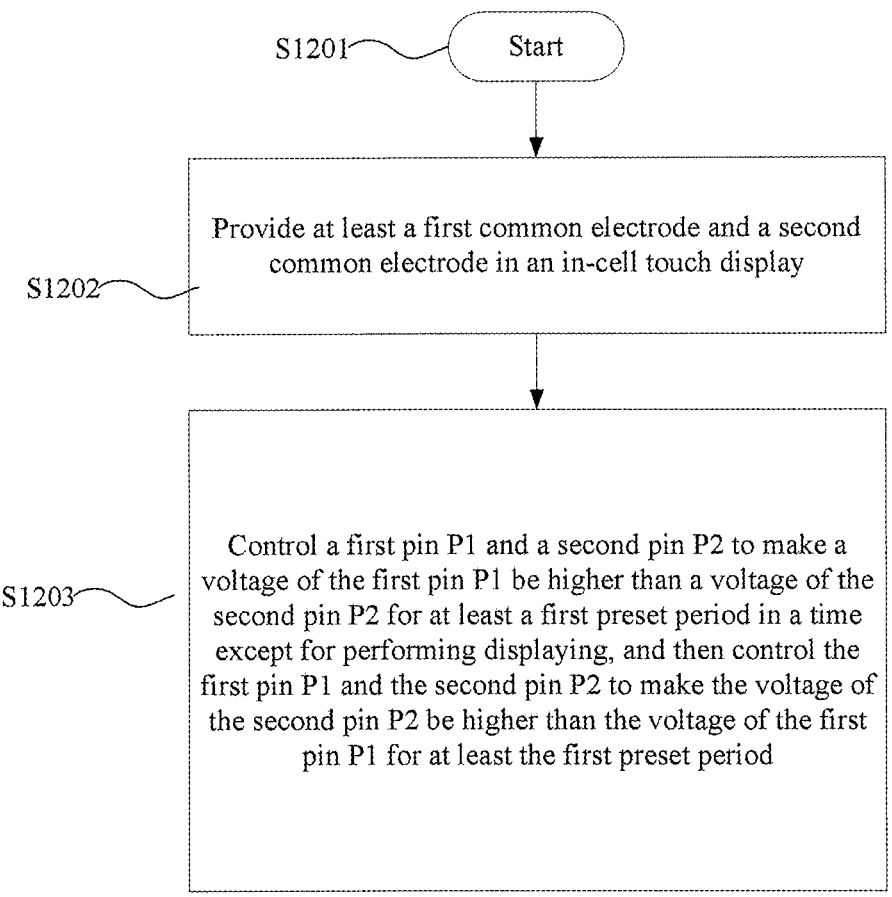
FIG. 12 is a flow chart showing a method for eliminating/reducing image sticking of the in-cell touch display according to a preferred embodiment of the present invention.

According to the above-mentioned embodiment, the method for eliminating/reducing image sticking of the in-cell touch display of the present invention may be generalized to include the following steps flow. FIG. 12 is a flow chart showing a method for eliminating/reducing image sticking of the in-cell touch display according to a preferred embodiment of the invention. Referring to FIG. 12, the method for eliminating/reducing image sticking of the in-cell touch display comprises the following steps.

In step S1201, the method starts.

In step S1202, at least a first common electrode and a second common electrode are provided in the in-cell touch display. Referring to FIG. 5, the first common electrode 501 and the second common electrode 502 are used to perform touch sensing. The first common electrode 501 is electrically connected to a first pin P1 of the display driving and touch integrated circuit 402 through the first charge/discharge route R1, and the second common electrode 502 is electrically connected to a second pin P2 of the display driving and touch integrated circuit 402 through the second charge/discharge route R2.

In step S1203, in a time except for display time, the first pin P1 and the second pin P2 are controlled so that a voltage of the first pin P1 is higher than a voltage of the second pin P2 for at least a first preset period. Thereafter, the first pin P1 and the second pin P2 are controlled so that the voltage of the second pin P2 is higher than the voltage of the first pin P1 for at least the first preset period. The above-mentioned time except for display time, does not represent the duration when the display does not display any frame, but represents the duration when the liquid crystal electrodes are not charged/discharged, such as the duration before or after the vertical scan duration or touch sensing duration. The invention is not restricted thereto.

Figure 13:
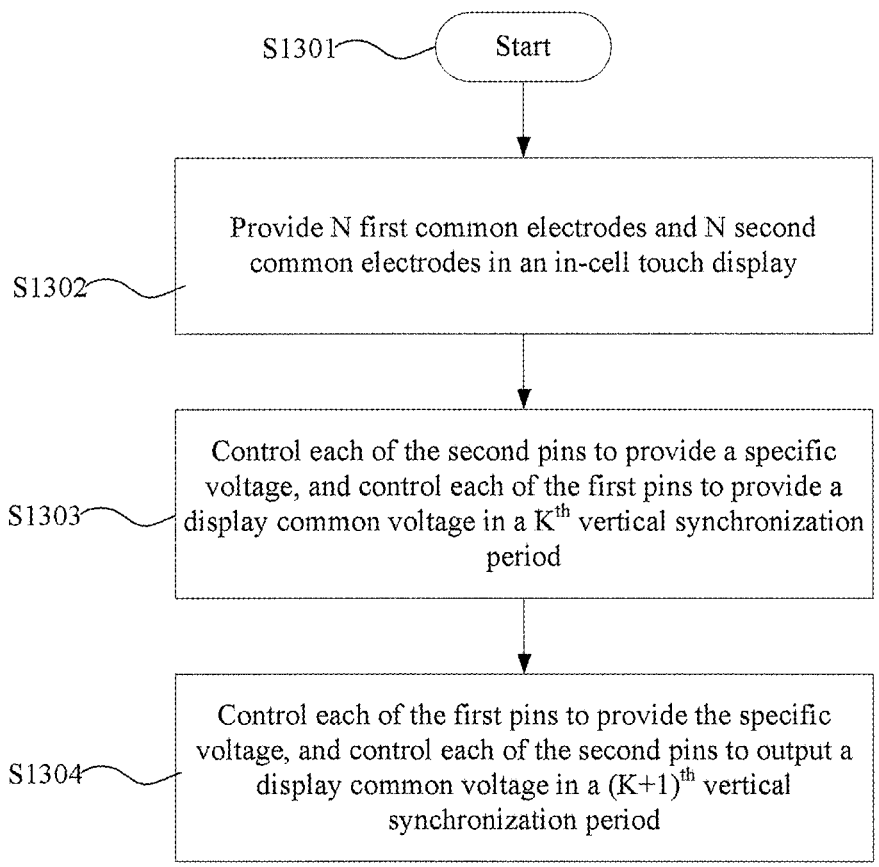
FIG. 13 is a flow chart showing a method for eliminating/reducing image sticking of the in-cell touch display according to a preferred embodiment of the present invention.

When the touch sensing electrodes are changed into multiple sets, and the touch sensing is not performed in each vertical synchronization period, the process steps of the method for eliminating/reducing image sticking according to the invention are shown in FIG. 13. FIG. 13 is a flow chart showing a method for eliminating/reducing image sticking of the in-cell touch display according to a preferred embodiment of the invention. Referring to FIG. 13, the method for eliminating/reducing image sticking of the in-cell touch display comprises the following steps.

In step S1301, the method starts.

In step S1302, N first common electrodes and N second common electrodes are provided in the in-cell touch display, wherein the $K^{th}$ first common electrode is electrically connected to the $K^{th}$ first pin of the touch control circuit through the $K^{th}$ first charge/discharge route, and the $K^{th}$ second common electrode is electrically connected to the $K^{th}$ second pin of the touch control circuit through the $K^{th}$ second charge/discharge route.

In step S1303, in the $K^{th}$ vertical synchronization period, each of the second pins is controlled to provide a specific voltage, and each of the first pins is controlled to provide a display common voltage. The specific voltage is equal to 0V, for example.

In step S1304, in the $(K+1)^{th}$ vertical synchronization period, each of the first pins is controlled to provide the specific voltage, and each of the second pins is controlled to output the display common voltage.

In the embodiment of the step S1303, the specific voltage needs not to be equal to 0V, and the first pin needs not to provide the display common voltage. Similar to the embodiment of FIG. 7, the essence of the invention can be satisfied as long as the voltage of the second pin is higher than that of the first pin in the step S1303. Similarly, in the embodiment of the step S1304, the specific voltage needs not to be equal to 0V, and the second pin needs not to output the display common voltage. Similar to the embodiment of FIG. 7, the essence of the invention can be satisfied as long as the voltage of the first pin is higher than that of the second pin in the step S1304. So, the invention is not limited thereto.

Figure 14:
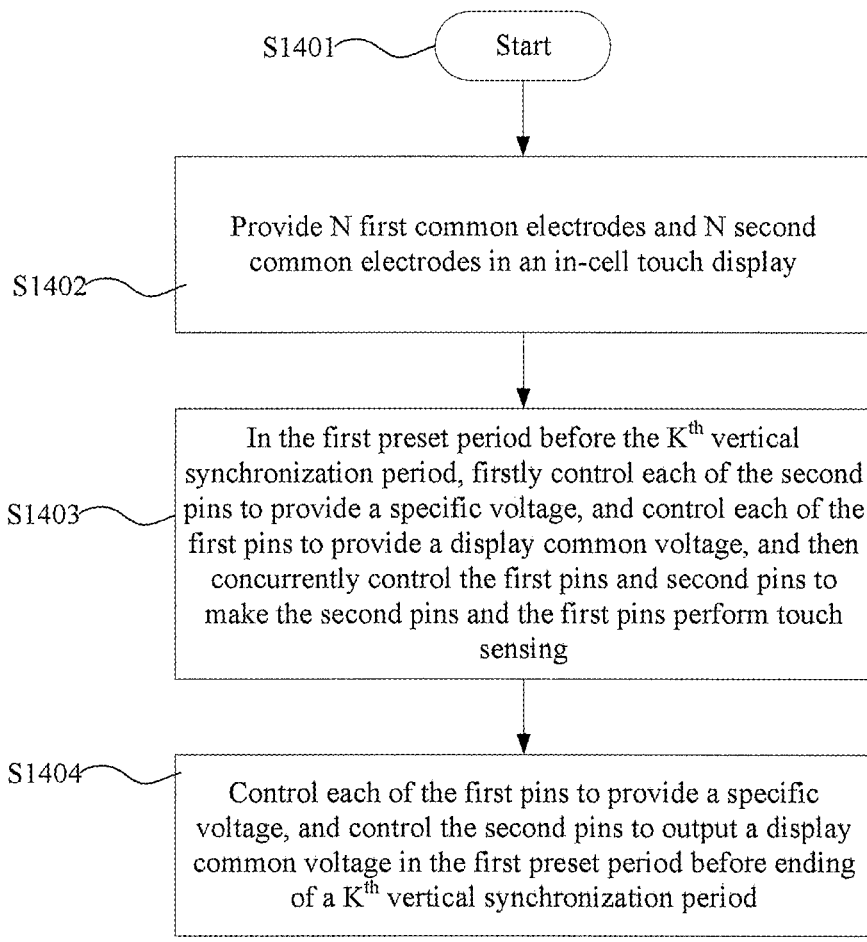
FIG. 14 is a flow chart showing a method for eliminating/reducing image sticking of the in-cell touch display according to a preferred embodiment of the present invention.

When the touch sensing electrodes are grouped into multiple sets, and the method for eliminating/reducing image sticking according to the present invention and touch sensing are performed in each vertical synchronization period, the steps are shown in FIG. 14. FIG. 14 is a flow chart showing a method for eliminating/reducing image sticking of the in-cell touch display according to a preferred embodiment of the invention. Referring to FIG. 14, the method for eliminating/reducing image sticking of the in-cell touch display comprises the following steps.

In step S1401, the method starts.

In step S1402, N first common electrodes and N second common electrodes are provided in the in-cell touch display, wherein the $K^{th}$ first common electrode is electrically connected to the $K^{th}$ first pin of the touch control circuit through the $K^{th}$ first charge/discharge route, and the $K^{th}$ second common electrode is electrically connected to the $K^{th}$ second pin of the touch control circuit through the $K^{th}$ second charge/discharge route.

In step S1403, in the first preset period before the $K^{th}$ vertical synchronization period, each of the second pins is firstly controlled to provide a specific voltage, and each of the first pins is controlled to provide a display common voltage. Thereafter, the first pins and the second pins are concurrently controlled to make the second pins and the first pins perform touch sensing.

In step S1404, in a first preset period before ending of the $K^{th}$ vertical synchronization period, each of the first pins is controlled to provide the specific voltage, and the second pins are controlled to output the display common voltage.

The method of the embodiment of FIG. 14 is shown in FIG. 9, and the embodiment has the advantage that 60 counts of switching of the electric-field direction between the first set of touch sensing electrodes 6A and the second set of touch sensing electrodes 6B can be performed per second, and the drawback is that the switching time is shorter than that of each of the embodiments of FIGS. 7 and 8.

Figure 15:
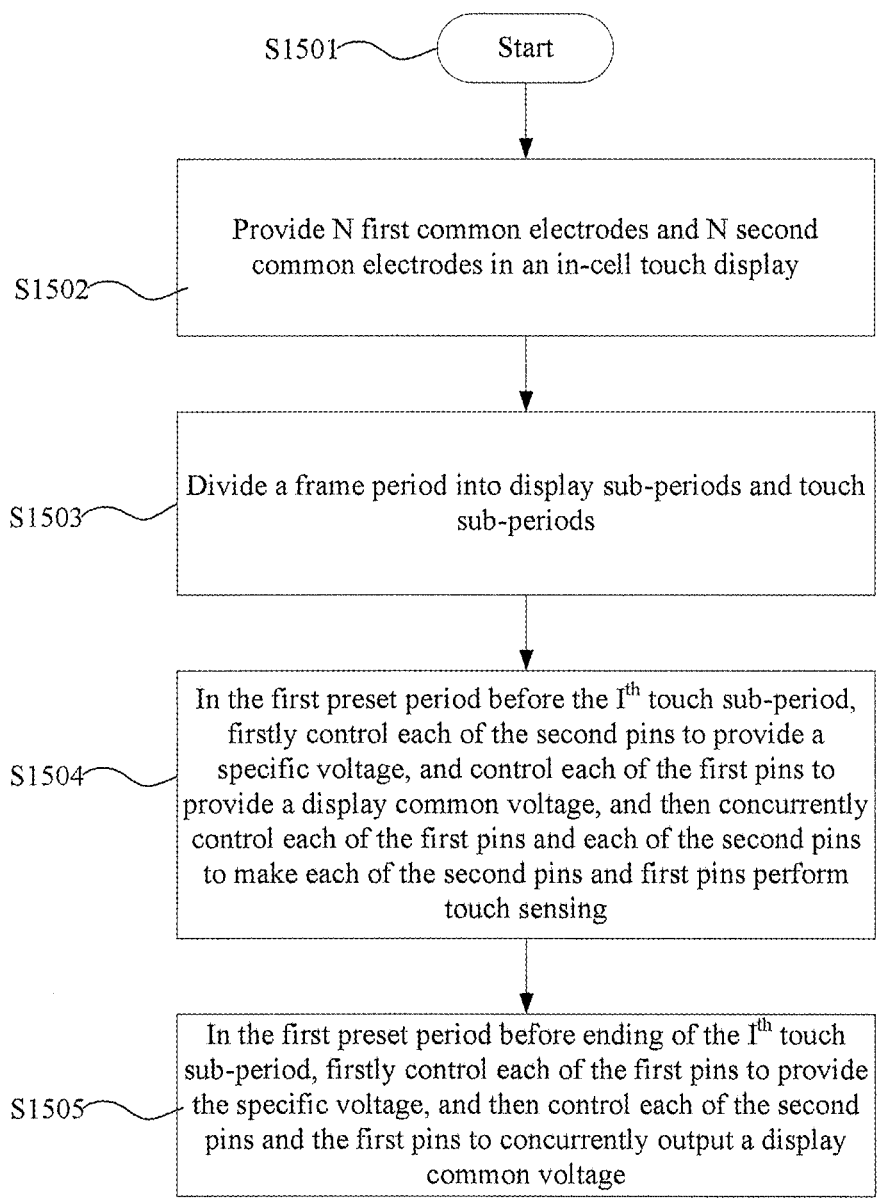
FIG. 15 is a flow chart showing a method for eliminating/reducing image sticking of the in-cell touch display according to a preferred embodiment of the present invention.

Similarly, when the touch sensing electrodes are changed into multiple sets, and the method for eliminating/reducing image sticking according to the invention is performed in each touch sub-period, the process steps are shown in FIG. 15. FIG. 15 is a flow chart showing a method for eliminating/reducing image sticking of the in-cell touch display according to a preferred embodiment of the invention. Referring to FIG. 15, the method for eliminating/reducing panel image sticking of the in-cell touch display comprises the following steps.

In step S1501, the method starts.

In step S1502, N first common electrodes and N second common electrodes are provided in the in-cell touch display, wherein the $K^{th}$ first common electrode is electrically connected to the $K^{th}$ first pin of the touch control circuit through the $K^{th}$ first charge/discharge route, and the $K^{th}$ second common electrode is electrically connected to the $K^{th}$ second pin of the touch control circuit through the $K^{th}$ second charge/discharge route.

In step S1503, a frame period is divided into display sub-periods and touch sub-periods.

In step S1504, in the first preset period before the $I^{th}$ touch sub-period, each of the second pins is firstly controlled to provide a specific voltage, and each of the first pins is controlled to provide a display common voltage. Thereafter, each of the first pins and each of the second pins are concurrently controlled to make each of the second pins and the first pins perform touch sensing.

In step S1505, in the first preset period before ending of the $I^{th}$ touch sub-period, each of the first pins is firstly controlled to provide the specific voltage, and then each of the second pins and each of the first pins are controlled to concurrently output the display common voltage.

In summary, the essence of the invention is to divide the touch sensing electrodes into at least two sets in the non-display duration, wherein the two sets of touch sensing electrodes are respectively applied with a first voltage and a second voltage different from the first voltage. Thereafter, one set of the touch sensing electrodes, which are formerly applied with the first voltage, are applied with the second voltage, and the other set of the touch sensing electrodes, which are formerly applied with the second voltage, are applied with the first voltage. The operations are repeated so that the electric-field direction switches between the first sets of touch sensing electrodes and the second sets of touch sensing electrodes continuously. Thus, the charge accumulation effect caused by the voltage difference between two sets of touch sensing electrodes can be effectively cancelled out, and the image sticking phenomenon of the display device is further eliminated or reduced.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A method for eliminating/reducing image sticking of an in-cell touch display, the method comprising the steps of:
   (a) providing at least a first sensing electrode and a second sensing electrode in the in-cell touch display to perform touch sensing operation, wherein the first sensing electrode is electrically connected to a first pin of a touch control circuit through a first charge/discharge route, and the second sensing electrode is electrically connected to a second pin of the touch control circuit through a second charge/discharge route; and
   (b) in a time except for display time, controlling the first pin and the second pin to make a voltage of the first pin be higher than a voltage of the second pin for at least a first preset period, and then controlling the first pin and the second pin to make the voltage of the second pin higher than the voltage of the first pin for at least the first preset period, wherein the first sensing electrode and the second sensing electrode are disposed on a same layer;
   wherein an electric field between the first sensing electrode and the second sensing electrode is changed in step (b) and accumulated charges of the neighboring sensing electrodes are effectively eliminated or reduced, wherein the accumulated charges are caused by a voltage difference between the first sensing electrode and the second sensing electrode when touch sensing operation is performed.

2. The method according to claim 1, further comprising:
   dividing a frame period into display sub-periods and touch sub-periods;
   wherein the step (b) comprises:
      in the first preset period before the $K^{th}$ touch sub-period, controlling the second pin to provide a specific voltage and controlling the first pin to provide a display common voltage, and then controlling the first pin and the second pin concurrently to make the second pin and the first pin perform touch sensing; and
      controlling the first pin to provide the specific voltage in the first preset period before ending of the $K^{th}$ touch sub-period, and then controlling the second pin and the first pin to output the display common voltage concurrently,
   where K is a natural number.

3. The method according to claim 1, wherein, step (b) comprises:
   controlling the second pin to provide a specific voltage and controlling the first pin to provide a display common voltage in a $K^{th}$ vertical synchronization period; and
   controlling the first pin to provide the specific voltage and controlling the second pin to output the display common voltage in a $(K+1)^{th}$ vertical synchronization period,
   where K is a natural number.

4. The method according to claim 1, further comprising:
   dividing a frame period into display sub-periods and touch sub-periods;
   wherein, step (b) comprises:
      in the first preset period before the $K^{th}$ touch sub-period, controlling the first pin to provide a voltage higher than the voltage of the second pin, and then controlling the second pin and the first pin to perform touch sensing; and
      controlling the second pin to provide the voltage higher than the voltage of the first pin in the first preset period before ending of the $K^{th}$ touch sub-period, and controlling the first pin and the second pin to make the first pin and the second pin output a display common voltage concurrently after the first preset period elapses.

5. The method according to claim 1, wherein the step (b) comprises:
   in the first preset period before a $K^{th}$ vertical synchronization period, firstly controlling the second pin to provide a specific voltage, and controlling the first pin to provide a display common voltage, and then controlling the first pin and the second pin concurrently to make the second pin and the first pin perform touch sensing, and controlling the first pin to provide the specific voltage and controlling the second pin to output the display common voltage in the first preset period before ending of the $K^{th}$ vertical synchronization period,
   where K is a natural number.

6. The method according to claim 1, wherein the in-cell touch display comprises N first sensing electrodes and N second sensing electrodes, wherein the $K^{th}$ first sensing electrode is electrically connected to the $K^{th}$ first pin of the touch control circuit through a $K^{th}$ first charge/discharge route, and the $K^{th}$ second sensing electrode is electrically connected to a $K^{th}$ second pin of the touch control circuit through a $K^{th}$ second charge/discharge route, where K and N are natural numbers, and N≥K>0.

7. The method according to claim 6, further comprising:
   dividing a frame period into display sub-periods and touch sub-periods;
   wherein the step (b) comprises:
      in the first preset period before the $I^{th}$ touch sub-period, firstly controlling the second pins to provide a specific voltage, and controlling the first pins to provide a display common voltage, and then concurrently controlling the first pins and the second pins to make the second pins and the first pins perform touch sensing; and
      in the first preset period before ending of the $I^{th}$ display sub-period, firstly controlling the first pins to provide the specific voltage, and then controlling the second pins and the first pins to concurrently output a display common voltage,
   where I is a natural number.

8. The method according to claim 6, further comprising:
   dividing a frame period into display sub-periods and touch sub-periods;
   wherein the step (b) comprises:
      in the first preset period before the $I^{th}$ touch sub-period, controlling the first pins to provide a voltage higher than the voltages of the second pins, and then concurrently controlling the second pin and the first pin to perform touch sensing; and
      controlling the second pins to provide the voltage higher than the voltages of the first pins in the first preset period before ending of the $I^{th}$ display sub-period, and controlling the first pin and the second pin to make the first pin and the second pin output a display common voltage concurrently after the first preset period elapses,
   where I is a natural number.

9. A mobile device, comprising:
   an in-cell touch display, comprising at least a first sensing electrode and a second sensing electrode to perform touch sensing; and a touch control circuit, comprising at least a first pin and a second pin, wherein the first sensing electrode is electrically connected to the first pin of a touch control circuit through a first charge/discharge route, the second sensing electrode is electrically connected to a second pin of the touch control circuit through a second charge/discharge route;

wherein in a time except for display time, the touch control circuit controls the first pin and the second pin to make a voltage of the first pin be higher than a voltage of the second pin for at least a first preset period, and then the touch control circuit controls the first pin and the second pin to make the voltage of the second pin be higher than the voltage of the first pin for at least the first preset period such that an electric field between the first sensing electrode and the second sensing electrode is changed and accumulated charges of the neighboring sensing electrodes are effectively eliminated or reduced, wherein the accumulated charges is caused by a voltage difference between the first sensing electrode and the second sensing electrode when touch sensing operation is performed, wherein the first sensing electrode and the second sensing electrode are disposed side by side on a same layer.

10. The mobile device according to claim 9, wherein a frame period is divided into display sub-periods and touch sub-periods when the operation of the touch control circuit is performed, wherein, in the first preset period before the $K^{th}$ touch sub-period, the touch control circuit controls the second pin to provide a specific voltage and controlling the first pin to provide a display common voltage, and then the touch control circuit controls the first pin and the second pin concurrently to make the second pin and the first pin perform touch sensing, and the touch control circuit controls the first pin to provide the specific voltage in the first preset period before ending of the $K^{th}$ touch sub-period, and then the touch control circuit controls the second pin and the first pin to output the display common voltage concurrently, where K is a natural number.

11. The mobile device according to claim 9, wherein the touch control circuit controls the second pin to provide a specific voltage and the touch control circuit controls the first pin to provide a display common voltage in a $K^{th}$ vertical synchronization period, and the touch control circuit controls the first pin to provide the specific voltage and the touch control circuit controls the second pin to output the display common voltage in a (K+1)th vertical synchronization period, is performed, where K is a natural number.

12. The mobile device according to claim 9, wherein a frame period is divided into display sub-periods and touch sub-periods when the operation of the touch control circuit is performed, in the first preset period before the $K^{th}$ touch sub-period, the touch control circuit controls the first pin to provide a voltage higher than the voltage of the second pin, and then the touch control circuit controls the second pin and the first pin to perform touch sensing; and before ending of the $K^{th}$ touch sub-period, the touch control circuit controls the second pin to provide the voltage higher than the voltage of the first pin in the first preset period, and the touch control circuit controls the first pin and the second pin to make the first pin and the second pin output a display common voltage concurrently after the first preset period elapses, where K is a natural number.

13. The mobile device according to claim 9, wherein, in the first preset period before a $K^{th}$ vertical synchronization period, the touch control circuit firstly controls the second pin to provide a specific voltage, and the touch control circuit controls the first pin to provide a display common voltage, and then the touch control circuit controls the first pin and the second pin concurrently to make the second pin and the first pin perform touch sensing, and the touch control circuit controls the first pin to provide the specific voltage and the touch control circuit controls the second pin to output the display common voltage in the first preset period before ending of the $K^{th}$ vertical synchronization period, where K is a natural number.

14. The mobile device according to claim 9, wherein the in-cell touch display comprises N first sensing electrodes and N second sensing electrodes, wherein the $K^{th}$ first sensing electrode is electrically connected to the $K^{th}$ first pin of the touch control circuit through a $K^{th}$ first charge/discharge route, and the $K^{th}$ second sensing electrode is electrically connected to a $K^{th}$ second pin of the touch control circuit through a $K^{th}$ second charge/discharge route, where K and N are natural numbers, and $N \geq K > 0$.

15. The mobile device according to claim 14, wherein a frame period is divided into display sub-periods and touch sub-periods when the operation of the touch control circuit is performed, in a second preset period before the $I^{th}$ touch sub-period, the touch control circuit firstly controls the second pins to provide a specific voltage, and the touch control circuit controls the first pins to provide a display common voltage, and then the touch control circuit concurrently controls the first pins and the second pins to make the second pins and the first pins perform touch sensing; and in the second preset period before ending of the $I^{th}$ display sub-period, the touch control circuit firstly controls the first pins to provide the specific voltage, and then the touch control circuit controls the second pins and the first pins to concurrently output a display common voltage, where I is a natural number.

16. The mobile device according to claim 14, wherein a frame period is divided into display sub-periods and touch sub-periods when the operation of the touch control circuit is performed, wherein the step (b) comprises:
in the first preset period before the $I^{th}$ touch sub-period, the touch control circuit controls the first pins to provide a voltage higher than the voltages of the second pins, and then the touch control circuit concurrently controls the second pin and the first pin to perform touch sensing; and the touch control circuit controls the second pins to provide the voltage higher than the voltages of the first pins in the first preset period before ending of the $I^{th}$ display sub-period, and the touch control circuit controls the first pin and the second pin to make the first pin and the second pin output a display common voltage concurrently after the first preset period elapses, where I is a natural number.

17. A method for eliminating/reducing image sticking of an in-cell touch display, the method comprising the steps of:
(a) providing at least a first sensing electrode and a second sensing electrode in the in-cell touch display to perform touch sensing operation, wherein the first sensing electrode is electrically connected to a first pin of a touch control circuit through a first charge/discharge route, and the second sensing electrode is electrically connected to a second pin of the touch control circuit through a second charge/discharge route wherein the first sensing electrode and the second sensing electrode are respectively independent to perform sensing in the touch sensing operation; and (b) in a time except for display time, controlling the first pin and the second pin to make a voltage of the first pin be higher than a voltage of the second pin for at least a first preset period, and then controlling the first pin and the second pin to make the voltage of the second pin higher than the voltage of the first pin for at least the first preset period, wherein the first sensing electrode and the second sensing electrode are disposed on a same layer, wherein an electric field between the first sensing electrode and the second sensing electrode is changed in step (b) and accumulated charges of the neighboring sensing electrodes are effectively eliminated or reduced.

18. The method according to claim 17, wherein the first sensing electrode and the second sensing electrode are side by-side disposed on a same layer.

19. The method according to claim 17, wherein the accumulated charges is caused by a voltage difference between the first sensing electrode and the second sensing electrode when touch sensing operation is performed.

20. The method according to claim 17, wherein the first sensing electrode and the second sensing electrode are arranged in a matrix array.

* * * * *